Patented Oct. 9, 1951

2,570,478

UNITED STATES PATENT OFFICE 2,570,478

VINYLIDENE CHLORIDE INTERPOLYMER AS A COATING FOR REGENERATED CELLULOSE FILM

Gilbert Pitzl, Eggertsville, N. Y., assignor to E. I. du Pont de Nemours & Company, Wilmington, Del., a corporation of Delaware No Drawing. Application July 20, 1948, Serial No. 39,812

4 Claims. (Cl. 260—78.5)

This invention relates to the manufacture of moistureproof, heat-sealable, flexible transparent film, and more particularly to the production of a film comprising regenerated cellulose film coated with a moistureproof, heat-sealable, flexible transparent coating of organic polymeric material, which coating tightly adheres to the base film even under high moisture conditions.

The coating of flexible, transparent, regenerated cellulose film and the like with vinyl polymers and copolymers for the purpose of rendering the film moisture-resistant, heat sealable and otherwise improving the properties thereof is well known. Because they are tough, flexible, strong, odorless, transparent, heat sealable and inherently moisture-resistant, thin coatings of vinylidene chloride/acrylonitrile copolymers particularly recommend themselves for this purpose. Coatings of vinylidene chloride/acrylonitrile copolymers comprising at least 80% vinylidene chloride have excellent moistureproofness but their adhesion to the base film under high moisture conditions such as are encountered when the coated film is wrapped around products containing considerable water (cheese, fish, fresh vegetables, etc.), is very poor. In order to improve the adhesion, it is currently necessary to first apply an anchoring sub-coating and then the vinylidene chloride/acrylonitrile coating, which represents an extra processing step, and hence a commercial handicap.

An object of this invention therefore is to improve the adherence or anchorage to the base film of transparent, moistureproof heat-sealable coatings of vinylidene chloride copolymer.

Another object is to provide a regenerated cellulose film having in direct contact therewith a well adhered moistureproof, heat-sealable, transparent coating of vinylidene chloride copolymer.

Still another object is to provide moistureproof, heat-sealable transparent coatings of vinylidene chloride copolymer which copolymers strongly adhere directly to base materials, such as regenerated cellulose film, even when the coated base material is maintained in an atmosphere of high moisture content, or in direct contact with water for a considerable period of time. These and other objects will more clearly appear hereinafter.

After extensive research I have found that copolymers resulting from the copolymerization of vinylidene chloride, itaconic acid and at least one compound from the group consisting of acrylonitrile, alkyl esters of acrylic and methacrylic acids having from 1 to 18 carbon atoms in the alkyl group (e. g. methyl methacrylate, ethyl methacrylate, butyl methacrylate, octyl methacrylate, n-dodecyl methacrylate, n-octadecyl methacrylate, methyl acrylate, ethyl acrylate, propyl acrylate, butyl acrylate, etc.), phenyl methacrylate, cyclohexyl methacrylate, p-cyclohexylphenyl methacrylate, methacrylonitrile, methyl vinyl ketone, and vinyl chloride in the relative proportions hereinafter stated, constitute excellent moistureproof, heat-sealable, transparent coatings for regenerated cellulose and are outstanding in their ability to bond directly and strongly to regenerated cellulose film, which bond is highly resistant to the deteriorating influence of high moisture or water.

Accordingly, the above objects are achieved by coating a base film or sheet of regenerated cellulose, by any convenient coating technique, with a coating composition comprising essentially a copolymer of vinylidene chloride, itaconic acid and at least one compound from the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone and vinyl chloride.

In order to secure self-anchoring copolymers (i. e. copolymers capable of strongly adhering directly to regenerated cellulose) having the requisite degree of moistureproofness, heat-sealability, flexibility, etc., it is essential that the initial relative proportions of monomers in the reaction mixture be within the following ranges: The itaconic acid monomer content of the reaction mixture may be varied from 0.5% to 25%; below 0.5% the anchorage of the resulting copolymer under high moisture conditions is unsatisfactory and copolymers resulting from a reaction mixture containing in excess of 25% itaconic acid are not moistureproof. An itaconic acid monomer content of from 1–5% is preferred. A compound or compounds from the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone, and vinyl chloride should constitute from 3% to 40% of the monomer charge. Less than 3% of such compound(s) results in insolubility, and more than 40% imparts inferior moistureproofness. The vinylidene chloride of course constitutes the remaining 35% to 96.5% portion of the charge.

The monomers may be copolymerized by any known method to form the copolymers of this invention. For example, the copolymerization may be conducted in aqueous emulsions containing a catalyst and activator, e. g., ammonium persulfate and meta sodium bisulfite, and any of the well known emulsifying and/or dispersing agents. Alternatively, the copolymers of this invention may be prepared by polymerization of the monomeric components in bulk without added diluent, or the monomers may be reacted in appropriate organic solvent reaction media. The total catalyst-activator concentration should generally be kept within a range of about 0.01% to about 2.0% by weight of the monomer charge, and preferably within a range of concentration of 0.1% to 1.0%. Improved solubility and viscosity values are obtained by conducting the polymerization in the presence of mercaptans such as ethyl mercaptan, lauryl mercaptan, tertiary dodecyl mercaptan, etc., which are effective in reducing cross-linking in the copolymer. In general, the mercaptans should be used in concentrations of 0.1% to 5.0% by weight, based on the weight of polymerizable monomers present in the charge.

The copolymers of this invention are coated on the regenerated cellulose base film by any suitable technique, and may be applied as an organic solvent solution or from aqueous emulsion.

The following examples of preferred embodiments further illustrate the practice and principles of this invention. Parts and percentages are by weight unless otherwise indicated.

EXAMPLE I

The following charge is placed in a vessel equipped with a thermometer, stirrer and reflux condenser:

|  | Parts |
| --- | --- |
| Water | 775 |
| Ammonium persulfate | 3.2 |
| Sulfated methyl oleate | 16 |
| Itaconic acid | 10 |
| Acrylonitrile | 24 |
| Vinylidene chloride | 156 |

The above charge is heated to 33° C. under reflux and stirring and 0.21 part of meta sodium bisulfite in 25 parts of water is added. A reaction temperature of 32–34° is maintained for 3–4 hours after which time the emulsion is drawn off, coagulated with aluminum sulfate and the polymer purified. These conditions will produce an approximate 87/9/4 vinylidene chloride/acrylonitrile/itaconic acid copolymer in yields of about 70% which is soluble in 1,3-dioxolane, dioxane and cyclohexanone. The copolymer thus formed is dissolved in 1,3-dioxolane and coated on regenerated cellulose film 0.0012 of an inch thick in the usual manner. Typical properties of this copolymer compared with a 92/10 VCl₂/AN copolymer as coatings are summarized in Table I.

Table I

| Monomer Charge | 78/12/10-VCl₂*/AN†/IA‡ | 90/10-VCl₂/AN |
| --- | --- | --- |
| Coating Bath | 15% Solids in 1,3-Dioxolane. | 15% Solids in Methyl Ethyl Ketone. |
| Anchorage — 25° C. H₂O—10 days. | (1) Excellent | V. Poor. |
| Heat Seals — 35% R.H.—Initial. | {(2) 512 <br> {(3) 313 | 34. <br> 13. |

*Vinylidene chloride.
†Acrylonitrile.
‡Itaconic acid.

These data demonstrate the marked superiority in anchorage and heat seal strength of a coating of an itaconic acid modified copolymer over the vinylidene chloride-acrylonitrile copolymer coating.

(1) Anchorage refers to the adhesion of the coating to the base sheet when in direct contact with water. It is more fully defined in U. S. 2,301,959 (Lanning). Table I samples of the coated film were submerged in water at 25° C. for 10 days. The vinylidene chloride/acrylonitrile/itaconic acid coatings showed almost no tendency to separate from the base film, whereas the control sample of vinylidene chloride/acrylonitrile separated readily.

(2) The definition of and tests for determining heat seal bond strength are set forth in U. S. 2,236,546 (Mitchell).

(3) Whereas the initial heat seal value is the force in grams required to just rupture the seal; the peel heat seal value is the force required to separate the seal after it has been ruptured. It of course takes more strength to rupture the heat seal initially than it does to separate the seal after it has once been ruptured.

EXAMPLE II

The following charge is reacted as described in Example I:

|  | Parts |
| --- | --- |
| Water | 775 |
| Ammonium persulfate | 3.2 |
| Sulfated methyl oleate | 16 |
| Itaconic acid | 19 |
| Acrylonitrile | 19 |
| Vinylidene chloride | 152 | and 0.21 part of meta-sodium bisulfite in 25 parts of water is added during reaction as in Example I. The resulting copolymer coated on regenerated cellulose film 0.0012 of an inch thick from a 1,3-dioxolane solution of the same exhibits at 35% R. H. (relative humidity) an initial heat seal bond strength of 512, a peel heat seal value of 386, and excellent coating anchorage in water at 25° C.

EXAMPLE III

A charge consisting of:

|  | Parts |
| --- | --- |
| Water | 400 |
| Vinylidene chloride | 380 |
| Methyl acrylate | 20 |
| Itaconic acid | 8 |
| Duponol ME (sodium lauryl sulfate) | 8 |
| Ammonium persulfate | 2 |
| Meta-sodium bisulfite | 1 | is reacted at atmospheric pressure in a round-bottomed vessel fitted with a reflux condenser, a semi-circular blade stirrer and immersed in a water bath maintained at 33–34° C. The water catalyst and dispersing agent are placed in the vessel and stirred until solution is complete. The premixed monomers are then added, followed by the activator. The end of the polymerization is indicated by the cessation of vinylidene chloride reflux (1½ hours). To insure complete reaction the dispersion is stirred for an additional 30 minutes. Four parts of Darvan No. 1 (sodium beta naphthalene sulfonate condensed with formaldehyde) are added to the dispersion after reflux ceases.

The resulting dispersion is coated on regenerated cellulose film 0.00088″ thick, and the coated film after drying exhibits an initial heat seal bond strength at 35% R. H. and 75° F. of 452, a peel value of 408 and the coating remains well anchored to the base film after 3 days immersion in water at 25° C. In contrast the regenerated cellulose film coated with an identical copolymer, save for the deletion of itaconic acid, has an initial heat seal bond strength of 132, a peel value of 23 and the coating is poorly anchored to the base film.

EXAMPLE IV

A reaction mixture consisting of:

|  | Parts |
|---|---|
| Water | 400 |
| Vinylidene chloride | 368 |
| Acrylonitrile | 10 |
| Methyl acrylate | 14 |
| Itaconic acid | 8 |
| Duponol ME | 8 |
| Ammonium persulfate | 0.8 |
| Meta-sodium bisulfite | 0.4 | is reacted as described in Example III and 4 parts Darvan No. 1 added. Regenerated cellulose film coated with the resulting aqueous dispersion of the copolymer, and dried, has an initial heat seal bond strength at 35% R. H. and 75° F., of 619, a peel value of 379 and the coating remained well adhered to the base sheet even after immersion for 3 days in water at 25° C. Regenerated cellulose film coated with an identical copolymer except that itaconic acid is omitted has an initial heat seal bond strength of 95, a peel value of 30 and the coating is very poorly anchored to the base sheet.

EXAMPLE V

Following the procedure of Example III a copolymer dispersion is prepared from the following initial charge:

|  | Parts |
|---|---|
| Water | 200 |
| Vinylidene chloride | 184 |
| Butyl methacrylate | 16 |
| Itaconic acid | 4 |
| Duponol ME | 4 |
| Ammonium persulfate | 1 |
| Meta-sodium bisulfite | 0.5 | and 2 parts Darvan No. 1 added.

Regenerated cellulose film coated with the resulting copolymer dispersion has an initial heat seal bond strength of 275 and a peel value of 186 at 35% R. H. and at 75° F. The anchorage of the coating under high moisture conditions is good.

EXAMPLE VI

Following the procedure of Example III the following charge is reacted to produce a copolymer:

|  | Parts |
|---|---|
| Water | 200 |
| Vinylidene chloride | 184 |
| Methyl vinyl ketone | 16 |
| Itaconic acid | 4 |
| Duponol ME | 4 |
| Ammonium persulfate | 1 |
| Meta-sodium bisulfite | 0.5 | and 2 parts Darvan No. 1 added.

The initial heat seal bond strength and peel values at 35% R. H. and 75° F., of regenerated cellulose film coated with the copolymer dispersion so produced is 534 and 403 respectively. The anchorage of the coating after a 3 day immersion in water at 25° C., is excellent. When itaconic acid is omitted the resulting copolymer coated on regenerated cellulose film yields a coated film having an initial heat seal bond strength of only 19 and a peel value of 12.

EXAMPLE VII

A four-component copolymer is prepared from the following charge:

|  | Parts |
|---|---|
| Water | 90 |
| Vinylidene chloride | 82.8 |
| Methyl acrylate | 1.8 |
| Vinyl chloride | 5.4 |
| Itaconic acid | 1.8 |
| Duponol ME | 1.8 |
| Ammonium persulfate | 0.45 |
| Meta-sodium bisulfite | 0.23 | reacted for one hour in a Pyrex pressure bottle which is capped and rotated in a water bath maintained at 40° C. One part Darvan No. 1 is then added. Film coated with the resulting polymer in the usual fashion has an initial heat seal bond strength of 213 and a peel value of 163 measured at 35% R. H. and at 75° C.

EXAMPLE VIII

Following the procedure of the preceding example the following mixture is reacted:

|  | Parts |
|---|---|
| Water | 90 |
| Vinylidene chloride | 81 |
| Vinyl chloride | 9 |
| Itaconic acid | 1.8 |
| Sulfated methyl oleate | 1.8 |
| Ammonium persulfate | 0.45 |
| Meta-sodium bisulfite | 0.23 | and one part Darvan No. 1 then added.

Regenerated cellulose film coated with the aqueous dispersion of the copolymer so obtained has an initial heat seal bond strength of 199 and a peel value of 141 whereas regenerated cellulose film coated with a copolymer of vinylidene chloride and vinyl chloride in the ratio of 81:9 has an initial heat seal bond strength of 25 and a peel value of 9 measured under the same temperature (75° F.) and relative humidity (35%).

EXAMPLE IX

The following charge is reacted as in Example VII for 2½ hours at 50° C.

|  | Parts |
|---|---|
| Water | 90 |
| Vinylidene chloride | 82.8 |
| Methacrylonitrile | 7.2 |
| Itaconic acid | 1.8 |
| Sulfated methyl oleate | 4.5 |
| Ammonium persulfate | 0.9 |
| Meta-sodium bisulfite | 0.45 | followed by addition of one part Darvan No. 1.

The resulting copolymer dispersion coated on regenerated cellulose film gives a coated structure having an initial heat seal bond strength of 138 and a peel value of 66. The anchorage of the coating in the presence of water is good.

EXAMPLE X

Following the procedure of Example III, the following mixture is reacted:

|  | Parts |
|---|---|
| Water | 400 |
| Vinylidene chloride | 368 |
| Methyl acrylate | 24 |
| Itaconic acid | 8 |
| Ammonium persulfate | 0.8 |
| Meta-sodium bisulfite | 0.4 |
| Duponol ME | 8 | and 4 parts of Darvan No. 1 added.

Regenerated cellulose film coated with the resulting dispersion and dried has an initial heat seal bond of 450 at 35° R. H., 275 at 80% R.H., and 225 at 93% R. H., measured at 75° F., whereas film coated with an identical dispersion save that itaconic acid is omitted from the copolymer exhibits initial heat seal bond strengths of 80 at 35% R. H., and 20 at 80% and at 93% R. H.

These results demonstrate that the copolymers of this invention, when compared to a control (i. e. a film coated with a copolymer lacking the itaconic acid constituent) have improved adhesion as regenerated cellulose film coatings, measured by heat seal strength and anchorage in water tests.

While the invention contemplates the use of the novel copolymers herein as the essential film-former constituent of the coating or coating composition, it is to be understood that in many instances it will be desirable to incorporate in the coating or coating composition other effect materials such as slip agents, pigment, dyes, plasticizers, delustrants etc., and the addition of such materials is therefore understood to be within the purview of this invention.

The novel vinylidene chloride copolymer coatings of this invention, as shown hereinabove, strongly adhere directly to regenerated cellulose base film under substantially all conditions encountered in the use of transparent wrapping tissues, and thus enable the obtainment of vinylidene chloride copolymer-coated regenerated cellulose film without the necessity of applying to the base film a costly anchoring subcoat. Moreover coated films of this invention have superior heat-seal characteristics which of course enhance their value in the art of transparent wrapping tissue.

As many widely different embodiments can be made without departing from the spirit and scope of my invention, it is understood that said invention is not limited in any way except as defined in the appended claims.

I claim:

1. A moistureproof, heat-sealable wrapping tissue comprising regenerated cellulose film having a self-anchored coating comprising essentially a copolymer obtained by polymerizing a mixture of 0.5–25% of itaconic acid, 3–40% of at least one polymerizable compound from the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone, and vinyl chloride and 35–96.5% of vinylidene chloride, the proportions being selected to total 100%.

2. A transparent, moistureproof, heat-sealable wrapping tissue comprising a base of regenerated cellulose film coated with a composition comprising as the film-former a copolymer obtained by polymerizing a mixture of polymerizable monomers consisting of 0.5–25% itaconic acid, 3–40% acrylonitrile and 35–96.5% of vinylidene chloride the proportions being selected to total 100%.

3. The wrapping tissue of claim 1 wherein the copolymer is obtained by polymerizing a mixture of 2% itaconic acid, 6% methyl acrylate, and 92% vinylidene chloride.

4. A copolymer obtained by polymerizing a mixture of 0.5–25% of itaconic acid, 3–40% of at least one polymerizable compound from the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone, and vinyl chloride and 35–96.5% of vinylidene chloride, the proportions being selected to total 100%.

GILBERT PITZL.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,279,881 | D'Alelio | Apr. 14, 1942 |
| 2,298,039 | D'Alelio | Oct. 6, 1942 |
| 2,462,185 | Hauser | Feb. 22, 1949 |

OTHER REFERENCES

Wertheim: Textbook of Organic Chemistry, second edition, 1945, page 25.